No. 877,016. PATENTED JAN. 21, 1908.
L. A. TIRRILL.
ELECTRIC MOTOR.
APPLICATION FILED JUNE 7, 1906.
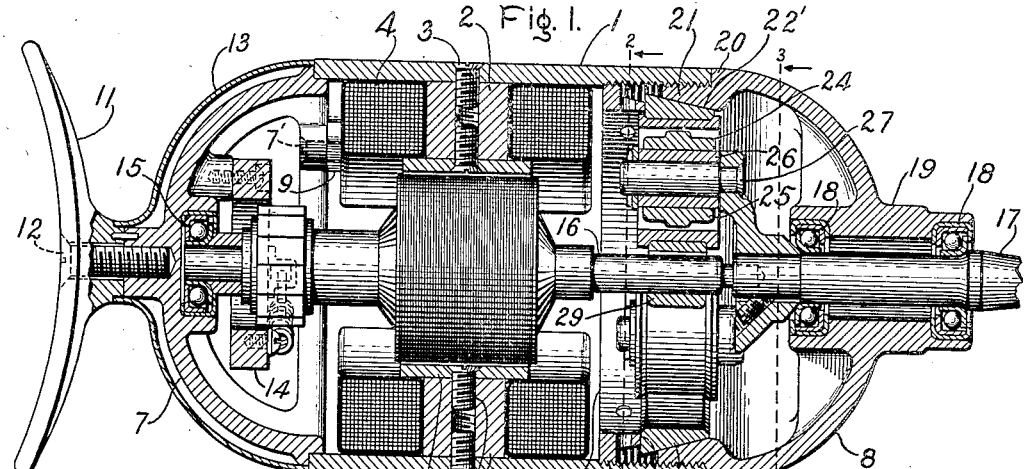
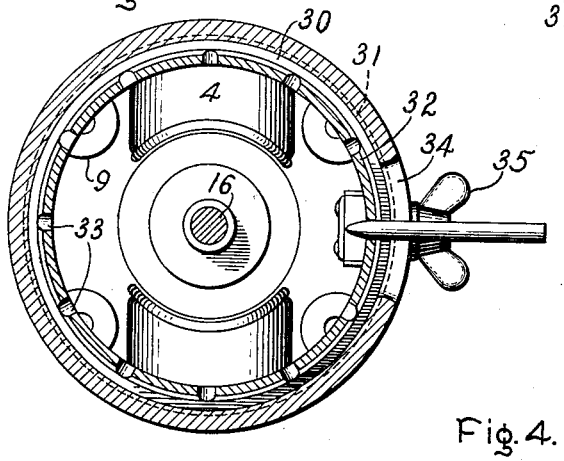 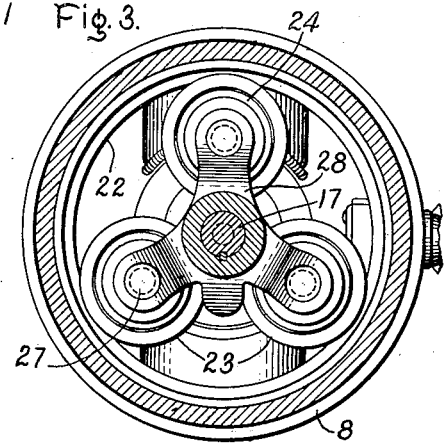
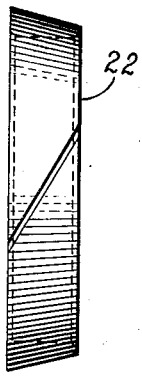
Witnesses:
Margaret E. Hooley
A. Eleu Oxford
Inventor:
Leonard A. Tirrill.
by Albert G. Davis
Atty.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

ELECTRIC MOTOR.

No. 877,016.  Specification of Letters Patent.  Patented Jan. 21, 1908.

Application filed June 7, 1906. Serial No. 320,494.

*To all whom it may concern:*

Be it known that I, LEONARD A. TIRRILL, a citizen of the United States, residing at Lynn, county of Essex, State of Massachusetts, have invented certain new and useful Improvements in Electric Motors, of which the following is a specification.

The object of my present invention is to provide an electric motor with a power transmitting shaft coupled to the armature shaft of the motor by a speed changing mechanism.

In carrying out my invention I have made the power transmitting shaft and the speed changing mechanism a part of the motor structure and have constructed and arranged the parts in such a manner as to form a neat and effective mechanism particularly adapted for use in small portable units such as breast drills and the like.

The various features of novelty which characterize my invention are pointed out with particularity in the claims annexed to and forming a part of this specification. For a better understanding of my invention, however, reference may be had to the accompanying drawings and descriptive matter in which I have illustrated one of the forms in which my invention may be embodied.

Of the drawings, Figure 1 is a sectional elevation of an electrically actuated breast drill constructed in accordance with my invention; Fig. 2 is a section on the line 2 2 of Fig. 1; Fig. 3 is a section on the line 3 3 of Fig. 1, Fig. 4 is an elevation of the split tension ring; and Fig. 5 is a sectional elevation illustrating the means for securing one end member in place.

Referring to the drawings, 1 represents the field ring of a motor which in the form shown is made of a section of a steel tube. Diametrically opposed pole pieces 2 are secured against the inner surfaces of the field ring 1 by screws 3. Each pole piece is surrounded by a winding or coil 4 retained in place by a pole shoe 5 which in turn is secured to the pole piece by a screw 6. As shown, the screws 3 and 6 for each pole extend into the ends of the same centrally formed passage in the pole piece.

Bonnets 7 and 8 are secured to opposite ends of the field ring 1. The bonnet 7 is secured to the field ring by means of screws 7' threaded into nuts 9 which are in turn secured to the field ring by screw 10. A support 11 to be engaged by the operator is secured to the end of the bonnet 7 by a screw 12. As shown, a shield 13 surrounding the bonnet 7 may be held in place by the support 11. The bonnet 7 has secured to it a brush holder yoke 14 and is provided with a bearing 15 for one end of the armature shaft 16 of the motor. The opposite end of the armature shaft 16 is reduced and enters the socket formed in the end of the power transmitting shaft 17. The power transmitting shaft 17 is journaled in two bearings 18 placed one at each end of a tubular portion 19 of the bonnet 8.

The bonnet 8 is provided with a shoulder 20 which abuts against the end of the field ring 1 and a reduced external threaded portion 21 which is secured into the adjacent internally threaded end of the field ring. As shown, the bonnet 8 is provided with a tapered or conical surface 22' which is engaged by the outer reversely tapered surface of a split tension ring 22. The inner surface of the split ring 22 is cylindrical and is engaged by three rollers 23 each in the form of a tubular cylinder of resilient material such as tempered steel. Each roller 23 surrounds a roller member 24, the external diameter of which is slightly less than the internal diameter of the surrounding rollers. Each roller member 24 comprises an outer member 25 of suitable material such as hardened brass or bronze and an inner member 26 of softer metal such as the so-called arguto metal. The members 24 are journaled each on one of three steel studs 27 secured to the spider 28, which in turn is secured to the shaft 17. The shaft 16 has keyed upon it a sleeve 29 of suitable material such as steel against the periphery of which the rollers 23 bear.

It will be observed that as the armature shaft 16 is rotated the rollers 23 are rotated between the sleeve 29 and the inner surface of the split ring 22. The angular bodily movement of the rollers 23 about the axis of the shaft 16, causes a corresponding angular movement of the spider 28 and shaft 17. In the construction shown the speed of rotation of the shaft 17 will be directly in proportion to but materially less than the speed of rotation of the shaft 16. The resilient rollers 23 are put under a compression in a direction radial to the shaft 16 in a degree dependent upon the maximum load transmitted. To regulate this compression I have provided an annular member 30 having an exteriorly threaded portion 31 which engages the threads on the inner surface of the field ring. Between the threaded portion 31 of the member 30 and the adjacent end of the split ring 22 extends a reduced portion 32 of the member 30 having formed in it a series of radial apertures 33. The field ring 1 is provided with a suitable slot 34 through which may be inserted a suitable tool or bar which enters the adjacent aperture 33 and serves as a means for rotating the member 30. As shown, the circumferentially extending slot 34 is longer than the space between the two holes 33. The angular adjustment of the member 30 thus produced results, by reason of the threaded engagement of the field ring 1, in a corresponding axial movement of the member 30. This regulates the extent to which the split ring 22 is forced into its conical seat in the bonnet member 8. By this angular adjustment of the member 30 therefore the split ring 22 may be compressed more or less as desired.

The field ring may have secured to it a suitable operating switch or circuit controlling device 35. It will be observed that the bearings 18 are arranged so that the thrust of the shaft 17 is taken by them and not transmitted to the armature shaft. The shaft 17 may have secured to it integrally or detachably, preferably the latter, any suitable tool to be operated such as a drill, screw driver bit, etc.

The construction hereinbefore described has been found in practice to be highly desirable for use in small portable units such as breast drills or the like which are adapted to be held in engagement with the work by the hands of the operator.

What I claim as new and desire to secure by Letters Patent of the United States, is,—

1. In an electric motor, a field ring having a portion at one end internally threaded, a bonnet or end member threaded exteriorly to engage the threaded portion of the field ring and formed with an interior tapered surface, an armature shaft, a second shaft, a coupling for the shafts including a split ring having an outer tapered surface engaging said inner tapered surface, and means for moving said split ring axially comprising an annular member threaded exteriorly to engage the threaded portion of the field ring.

2. In an electric motor, a field ring having a portion at one end interiorly threaded, a bonnet or end member provided with threads engaging the threaded portion of the field ring and formed with a tapered recess, an armature shaft, a second shaft in alinement therewith, a coupling for the shafts comprising resilient rollers and a split ring surrounding them and having an outer tapered surface entering said recess, and means for moving said split ring axially comprising an annular member having threads formed on its periphery to engage the threaded portion of the field ring.

3. In an electric motor, a field ring having a portion at one end threaded interiorly, a bonnet or end member provided with an exteriorly threaded portion screwed into the threaded portion of the field ring, said bonnet or end member having a tapered recess formed in it, an armature shaft, a second shaft in alinement therewith, and a coupling for the shafts including a split ring having an exterior tapered surface entering said recess, and means for moving said split ring axially in said recess to vary the diameter of the ring, comprising an annular member having a rib threaded exteriorly to engage the threaded portion of the field ring and a second portion engaging the end of the split ring, said second portion having a circumferentially extending series of holes formed in it, and the field ring being provided with a slot or opening to receive a tool entering said holes to adjust said annular member angularly.

In witness whereof, I have hereunto set my hand this 17 day of May, 1906.

LEONARD A. TIRRILL.

Witnesses:
  T. H. KENNEDY,
  FRANK. A. HUGO.